(No Model.) 3 Sheets—Sheet 3.
W. J. KEEP.
TESTING MACHINE.
No. 399,754. Patented Mar. 19, 1889.
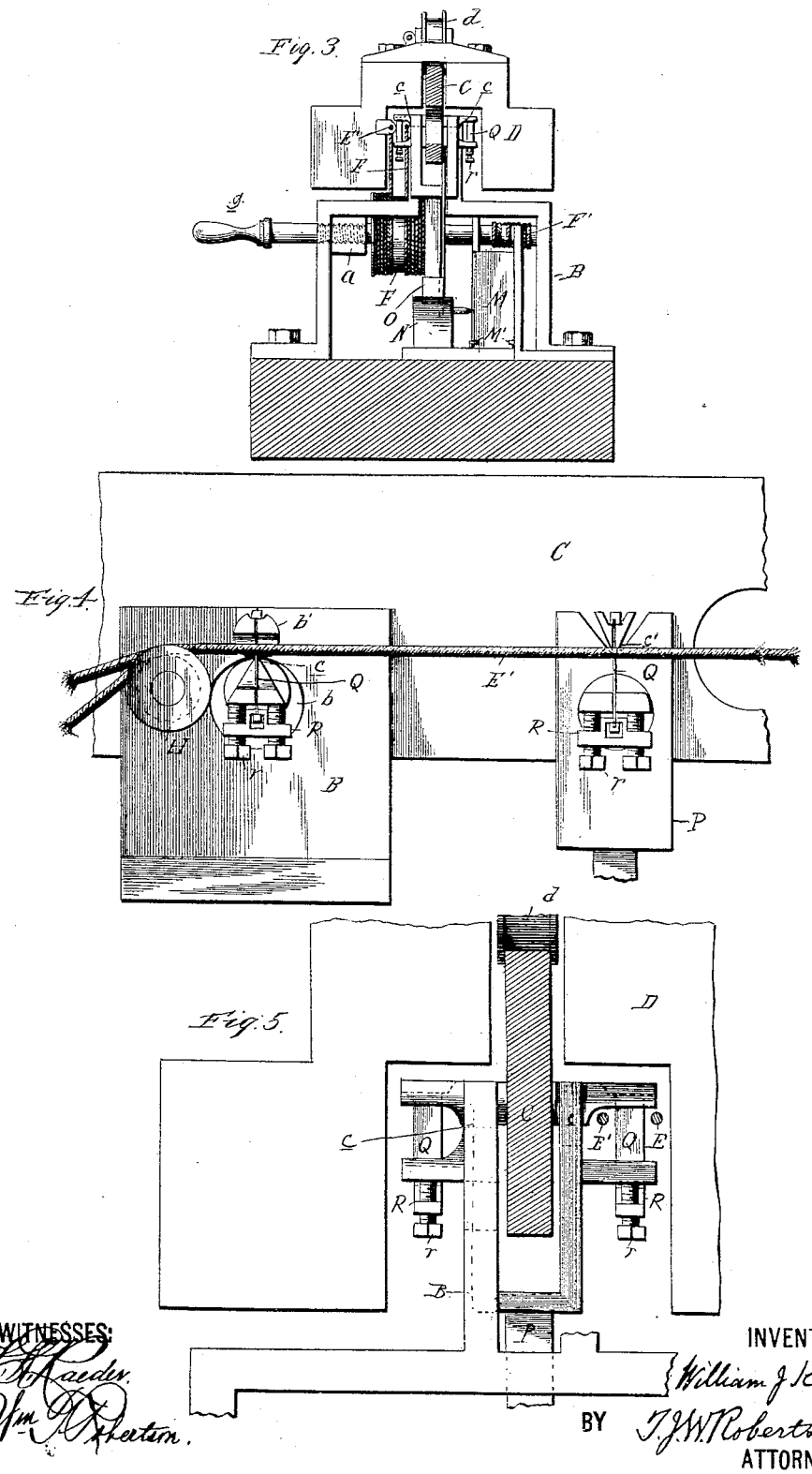

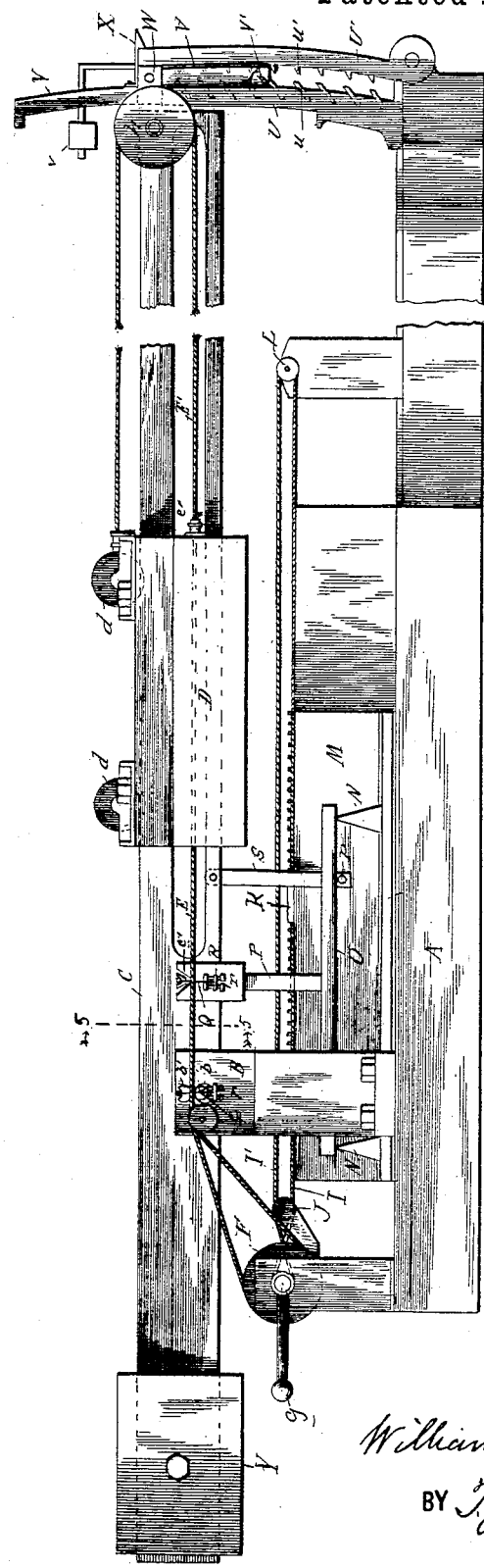

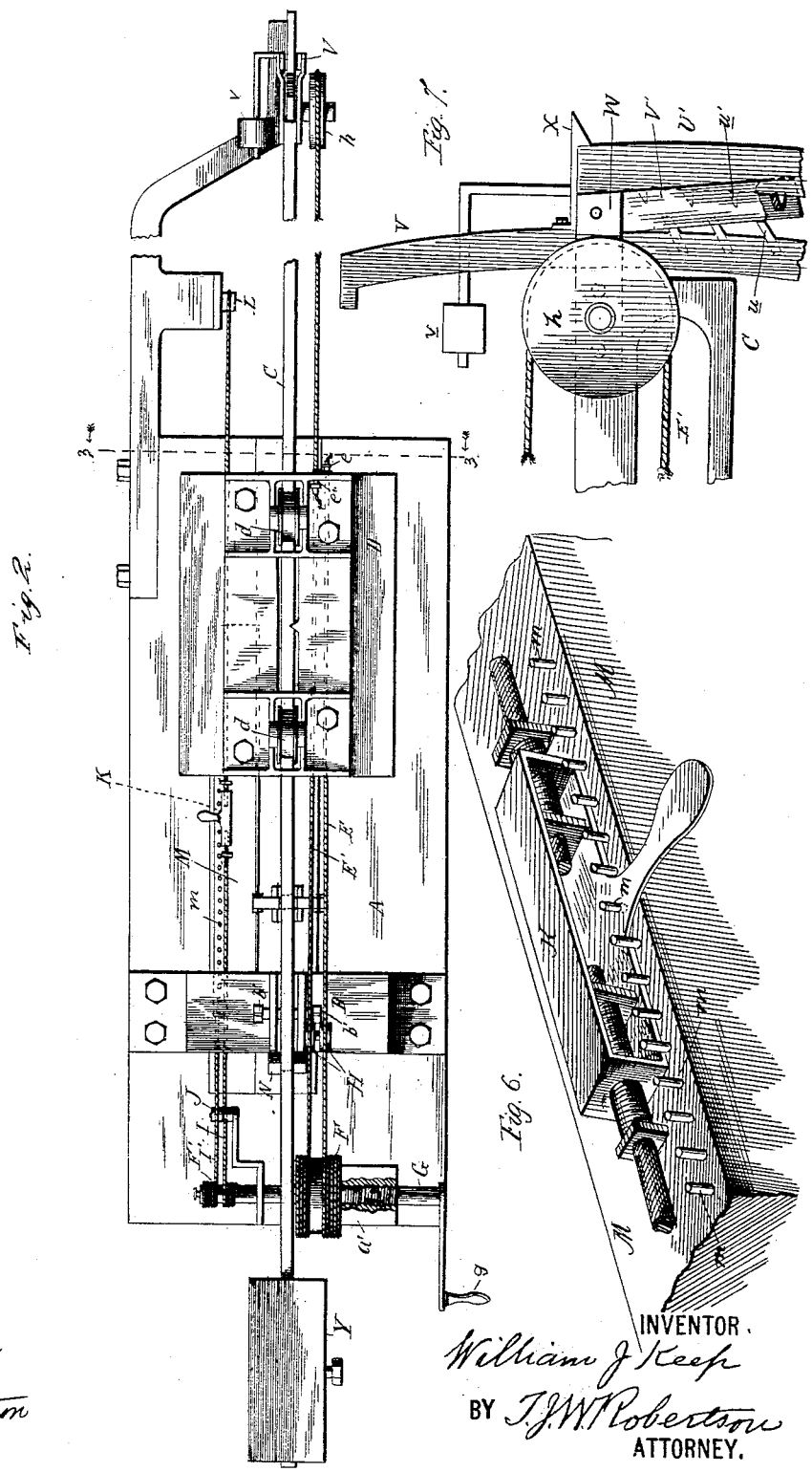

UNITED STATES PATENT OFFICE.

WILLIAM J. KEEP, OF DETROIT, MICHIGAN.

TESTING-MACHINE.

SPECIFICATION forming part of Letters Patent No. 399,754, dated March 19, 1889.

Application filed July 20, 1888. Serial No. 280,461. (No model.)

*To all whom it may concern:*

Be it known that I, WILLIAM J. KEEP, a citizen of the United States, residing at Detroit, in the county of Wayne and State of Michigan, have invented certain new and useful Improvements in Testing-Machines, of which the following is a specification, reference being had therein to the accompanying drawings.

This invention relates to a machine designed to test the strength of a bar of iron by sliding a weight along a lever so as to increase the pressure on the iron bar until the same is broken; and the invention consists in the peculiar construction, arrangement, and combination of parts, hereinafter more particularly described, and then definitely pointed out in the claims.

In the accompanying drawings, Figure 1 shows a side elevation of a machine constructed according to my improvement; Fig. 2, a plan of the same. Fig. 3 is a vertical cross-section through line 3 3, Fig. 2. Fig. 4 is a side elevation, on an enlarged scale, of the part of the beam, showing its connection with other parts. Fig. 5 is a cross-section through the beam and at the line 5 5, Fig. 1, and showing some of the connecting parts in elevation, also on a larger scale. Fig. 6 is a perspective view of a clasp, cord, and part of a paper-carrier, also on a larger scale. Fig. 7 is an enlarged elevation of part of the right-hand end of the machine, as shown in Fig. 1.

Referring now to the details of the drawings, A represents the base of the machine, from which rises a double standard, B, having apertures $b\ b$, above which are projecting lugs $b'\ b'$, forming a fulcrum, on which work knife-edges $c\ c$ of a horizontal beam, C. On this beam slides a peculiarly-formed double or saddle-shaped test-weight, D, provided with friction-rollers $d\ d$, that run on suitable shafts or bearings located on the top of the weight D. This weight is connected with the ends of two cords, E E', which are fastened at $e\ e'$ in any suitable manner, and whose other ends are attached to and wound around a drum, F, as shown in Fig. 2. This drum is on a shaft, G, which has a male thread cut on it, and works in a female thread cut in a bearing formed in the standard $a'$, which threads are so proportioned to the size of the cords E E' that the drum moves sidewise the thickness of the cords just as fast as a coil of the cord is wound upon or unwound from it. The cords E E' both pass over rollers or sheaves H, and one of these cords, E, is fastened directly to the weight at $e$, while the other one passes first around the sheave $h$ and then to the fastening $e'$, and the whole is so arranged that by turning the crank-handle of the shaft G the weight D may be made to travel along the beam C in either direction.

At the end of the shaft G opposite to the crank-handle is another and smaller drum, F', around which two other wire cords, I I', are wound, which pass over guide-sheaves J, and one, I, is fastened directly to a clasp, K, (see Fig. 6,) while the other cord passes around a sheave, L, and (returning) is then fastened to the other end of said clasp K, the whole being so arranged that by the turning of the crank-handle to move the weight the clasp K is moved simultaneously with the weight, but only at one-quarter of the speed.

The clasp K engages with one of a series of pins, $m$, on a sliding diagram-paper holder, M, which therefore moves with it and at a corresponding speed. M' is a guide for the paper-holder.

At N two bearings are shown, which may be of any suitable form, on which rests the test-bar O.

Attached to or formed with the beam C are two "knife-edges," $c'$, which bear on a post, P, whose lower end, when in action, rests upon the test-bar O.

To prevent the disarrangement of the parts, I prefer to connect the beam to its fulcrum and to the post P by means of steel ribbons Q, which are secured in holders R and are adjusted by set-screws $r$.

At S is shown a pencil-holder formed of a thin strip of metal attached to the beam C, and carrying at its lower end a pencil, $p$, and the whole is so arranged that as the test-bar is depressed by the beam the pencil $p$ will be carried downward and make a mark on a diagram-paper placed on the diagram-holder M, corresponding, but in an exaggerated degree, to the amount of depression of the test-bar.

At the right-hand end of the beam is a device to stop its fall on the breakage of the test-bar. This consists of a slotted arc made up of a fixed section, U, and a pivoted section, U', both connected to the base of the machine, and a dog, V, pivoted at $w$ to a yoke, W, on the beam C. This dog is provided with an adjustable counter-weight, $v$, so arranged as to tend to throw the dog V outward. Each section of the arc is provided with a series of teeth, those, $u$, on the section U being inclined upward, and I term them "steps," while those, $u'$, on the section U' are inclined downward, and I term them "chutes." At the bottom of the dog V is an inclined catch, $v'$, and the whole is so arranged that when the beam gradually descends the dog V descends with it; but when the test-bar breaks and the beam and dog begin to fall rapidly, then the dog strikes forcibly against one of the chutes $u'$ on the section U' and is rapidly shot over to the other section, and the catch $v'$ of the dog engages with one of the steps $u$, and its further fall and that of the beam is prevented.

For convenience in manipulation, the section U' is pivoted, as before explained, so that it can be readily moved outward, and when returned is held in its normal position by a spring-catch, X.

An examination of the drawings (see more particularly Fig. 3) will show that the standard B has an aperture beneath the beam, which allows the test-bar to be passed underneath said standard, and also allows the diagram-paper holder to pass underneath the same.

On the left-hand end of the beam is an adjustable counterbalance-weight, Y, which is intended to be so set on the beam that when the center of gravity of the weight D is exactly over the fulcrum of the beam the latter will be exactly balanced.

The operation is as follows: Supposing the test-bar to be firmly held in place and a diagram-paper fastened in any convenient way on the diagram-holder and the weight D over the fulcrum of the beam, the operator turns the crank-handle $g$, and thus gives a simultaneous but differential motion to the weight D and diagram-paper holder M, and as the weight travels along the beam it presses the post P harder and harder upon the test-bar, thus deflecting it. This deflection gradually increases as the weight moves until the latter exerts such a force on the test-bar that it is unable to stand the strain, and it finally breaks. As the deflection of the bar takes place, of course the beam C descends with it, thus carrying the pencil-holder S downward, and as the diagram-paper is moving slowly along the pencil is pressed upon the diagram-paper by the resiliency of the pencil-holder, and a curved line is marked upon the diagram-paper which corresponds in an exaggerated degree with the deflection of the test-bar as it bends under the pressure of the weight. As soon as the bar breaks, the operator should stop the turning of the crank-handle, and the breaking pressure can be seen at once by reference to the position of the weight on the beam, and also by the mark on the diagram-paper made by the pencil.

To prevent damage to the apparatus by the too sudden descent of the post, &c., I use the device shown at the right-hand end of Fig. 1. As long as the beam is gradually descending it offers no obstacle to its descent, as the dog V slips off tooth after tooth very gradually; but when the test-bar breaks there is of course a tendency of the beam and weight to fall rapidly, and as soon as this begins the rapid motion causes the dog V to strike so forcibly against one of the chutes $u'$ that it is carried over to the section U, and the catch $v'$ is arrested by one of the steps $u$, as before explained, and thus damage to the parts is prevented.

What I claim as new is—

1. In a testing-machine, the combination of a post to act on the article to be tested, a beam arranged over the post and bearing thereon, a weight running on the beam, and means, as the drum F and cords E E', for moving said weight along the beam, substantially as described.

2. In a testing-machine, the combination of a post to rest on the article being tested, a beam arranged over the post and bearing thereon, a diagram-paper holder, a pencil-holder, and means, as the drums F F and cords E E' I I', for giving simultaneous motion to the weight and diagram-paper holder, substantially as described.

3. In a testing-machine, the combination of a traveling device, as the weight D, a cord attached to and moving the same, an endwise-moving drum which winds the cord, a shaft carrying said drum, provided with a screw-thread, and a fixed bearing for said shaft having a female thread corresponding to the thread on the shaft, and arranged to move said shaft and drum endwise as it revolves the drum and winds the cord thereon, substantially as described.

4. In a testing-machine, the combination, with the beam resting on a fulcrum and constructed to bear on the article being tested, of a weight moved on the beam by a cord, and a drum having an endwise motion for coiling said cord, located below the beam and in the rear of the fulcrum, substantially as described.

5. In a testing-machine, the combination, with a beam and a diagram-paper holder moving parallel with the same, of a fulcrum-support provided with an aperture to receive said paper-holder and the test-bar, substantially as described.

6. In a testing-machine, and in combination with the beam thereof, a support for the test-bar, and a diagram-holder constructed to slide parallel with the beam, a pencil-holder, and means, as the beams C, moving in unison with the test-bar to communicate motion to said pencil-holder, substantially as described.

7. In a testing-machine, and in combination with the beam thereof and a support for the test-bar, a pencil-holder attached to and carried by the beam, and a diagram-paper holder constructed to slide parallel with the beam, substantially as described.

8. In a testing-machine, and in combination with the beam thereof and a pencil-holder attached thereto, a paper-holder, as M, ways for guiding the same, and means, as the revolving drum F and cords E E', for giving it motion, substantially as described.

9. In a testing-machine, and in combination with the beam and weight thereof, a retarding device, as the dog V, pivoted to the beam, and slotted arc U U', for stopping the motion of the beam, substantially as described.

10. In a testing-machine, and in combination with the beam and weight thereof, a dog, V, pivoted to the beam, and a slotted arc, U U', having chutes and steps, substantially as and for the purpose specified.

11. In a testing-machine, and in combination with the beam and weight thereof, a dog, V, pivoted to the beam, and a slotted arc consisting of the stationary section U and the pivoted section U', substantially as and for the purpose specified.

In testimony whereof I affix my signature, in presence of two witnesses, this 17th day of July, 1888.

WILLIAM J. KEEP.

Witnesses:
L. B. YOUNG,
ISAAC S. FILER.